Sept. 26, 1967  D. STANIMIROVITCH  3,343,994

DEFERRED ACTION ELECTRIC DEVICE AND MODE OF ACTIVATION

Filed June 4, 1965

INVENTOR
DOUCHAN STANIMIROVITCH

United States Patent Office 3,343,994
Patented Sept. 26, 1967

3,343,994
DEFERRED ACTION ELECTRIC DEVICE AND
MODE OF ACTIVATION
Douchan Stanimirovitch, Paris, France, assignor to Societe
des Accumulateurs Fixes et de Traction (Societe Anonyme), Romainville, France, a company of France
Filed June 4, 1965, Ser. No. 461,320
Claims priority, application France, June 24, 1964,
979,506
17 Claims. (Cl. 136—90)

This invention relates to electric deferred action cells or batteries, i.e., devices in which the activating fluid, here an electrolyte, is stored and maintained in a compartment distinct from the active elements, e.g., the electrodes and separators of the cell or cells, and is brought into contact with these elements in order to impregnate them only at that time when it is desired to put the battery or cell into use.

More particularly, the invention relates to a novel arrangement and a novel mode of transfer of the stored electrolyte for activating the cell at the desired time.

At present, several modes of transfer of the electrolyte are known. Among these, one consists in crushing a collapsible container containing the electrolyte at the time the cell is to be put into use, such crushing of the container being effected by an increase of the pressure around this collapsible container.

However, in the case of batteries comprising several deferred-action cells, in order to simultaneously apply pressure to several collapsible containers, it is necessary to use pipes and cylinder covers which often make the realization difficult and cumbersome.

This invention is aimed at remedying these drawbacks in a simple and effective manner.

An object and feature of the invention is a device for transferring electrolyte from a stored condition in a deferred action battery comprising a sealed or sealable casing in which one or several cell units are disposed, said device including two compartments for each cell unit connected e.g., by a conduit, one of said compartments containing the active elements, e.g., electrodes and separators of a cell and the other compartment having therein a container filled with electrolyte, said container having walls that are partly collapsible, flow of electrolyte therefrom to the compartment being prevented by a frangible seal. The arrangement is especially notable in that the compartment which has the electrolyte container therein is provided with a suitable check valve and also with a tight joint between the walls of the said compartment and those of the electrolyte container therein.

Another object and feature of the invention is a novel mode of transfer of the electrolyte in a deferred action cell or battery embodying the invention, which is especially notable in that in order to activate the cell or battery, i.e., to bring the stored electrolyte into contact with the active components of the battery, in a first stage, the same pressure is built up in both compartments, and, in a second stage, the container and the compartment containing the active elements of the battery only are evacuated or have the built-up pressure therein reduced so that the frangible seal is ruptured by the retained pressure in the electrolyte-containing compartment. As a result, the electrolyte within the electrolyte container pours or is forced to flow into the first or active element-containing compartment to activate the active elements therein.

Other characteristics and features of the invention will become apparent from the following description in relationship to the accompanying drawings, wherein.

Figure 1:
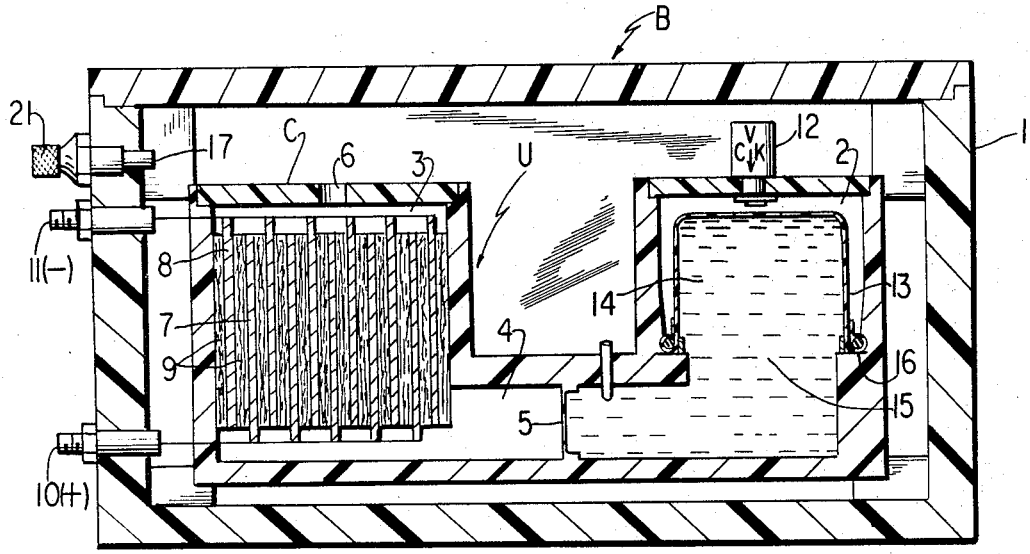
FIG. 1 is a diagrammatic view of a device embodying the invention.

Referring to the drawings and first to FIG. 1, the deferred action battery B comprises a casing 1 of suitable material and strength which may be sealed. This casing includes one or more cell units each comprsing two separate inner compartments 2 and 3 interconnected by a conduit 4 which is closed off by a frangible seal or wall 5 which may be ruptured as will be described.

Compartment 3 is provided with an opening 6 so as to communicate freely with the interior of casing 1. This compartment 3 also contains the positive electrodes 7 and negative electrodes 8 and separators 9 of a cell arranged, for example, in the manner shown in U.S. Patents Nos. 2,852,592 or 2,847,494. The positive and negative terminals 10 and 11 of the cell are led to the exterior of casing 1 in any convenient way.

A wall of compartment 2 is provided with a one-way check valve 12 of conventional type opening from the container space outside of compartment 2 into its interior. This compartment 2 contains a collapsible container 13 filled with an electrolyte 14, the latter also filling the conduit 4 up to the frangible wall 5 since the open end 15 of the container 14 opens into said conduit. The container 13, however, is sealed off from compartment 2, by a sealing gasket 16 or other type of sealing joint. Thus, as long as frangible wall 5 remains intact, none of the electrolyte 14 can reach the electrodes 7 and 8 and separator 9 in compartment 3.

When it is desired to activate the cell C, i.e. when the electrolyte 14 situated in container 13 is to be brought into contact with the electrodes 7 and 8 and separators 9 situated in compartment 3, the following procedure preferably is employed.

According to the invention, as a first step, a gas of any suitable kind, e.g., air under pressure is introduced into the interior of casing 1, by any suitable means, as through a conduit 17 that may be connected to a pressurized air supply source (not shown). This increases air pressure inside container 1. This same increased pressure is also transmitted directly into compartment 3 of unit U due to opening 6, and also into compartment 2 via one-way check valve 12.

Thus, since pressures in compartments 2 and 3 are then alike, the frangible wall 5 then has both faces subjected to the like opposite pressures and it remains intact.

Then, according to the invention, as a second step, the gas under pressure that has been introduced into casing 1 via conduit 17 has its pressure reduced by any suitable means as by evacuation. This causes a decrease in pressure in casing 1 and likewise in compartment 3 due to opening 6. However, since check valve 12 opens only inwardly into compartment 2, the increased pressure in compartment 2 is maintained. A pressure differential between compartments 2 and 3 occurs as a result and since the overpressure from compartment 2 then acts on the frangible wall 5 it is ruptured since it is now subjected to said overpressure on that one of its faces which is in communication with compartment 2.

When seal or wall 5 ruptures, the pressure still existing in compartment 2 causes the collapse of electrolyte container 13 therein, so that forced flow of electrolyte 14 therein is effected into compartment 3 via passage 4 and impregnates electrodes 7 and 8 and separators 9 therein, thus activating the cell components of unit U.

It is obvious that if casing 1 contains several units U comprising compartments similar to 2 and 3, and their respective components, these units U are simultaneously submitted to the pressure and evacuating steps hereinabove described and each cell of each compartment 3 of said unit U is thus activated simultaneously. This eliminates cumbersome auxiliary equipment and provides a simple mode of activating a plurality of cells simultaneously.

It is to be noted that in the arrangement described, the activation of the cell of each unit and the sequence of activating operations does not depend on the relative positions of the various compartments 2 and 3.

By using a device as described in accordance with the invention, it is possible to dispense with cumbersome auxiliaries such as pipes and cylinder-covers each in relationship with a collapsible electrolyte container, since the feature of the inventive method is the utilization of pressure introduced into a compartment containing the collapsible containers to rupture frangible walls and force electrolyte therefrom into activating contact with active cell elements.

Figure 2:
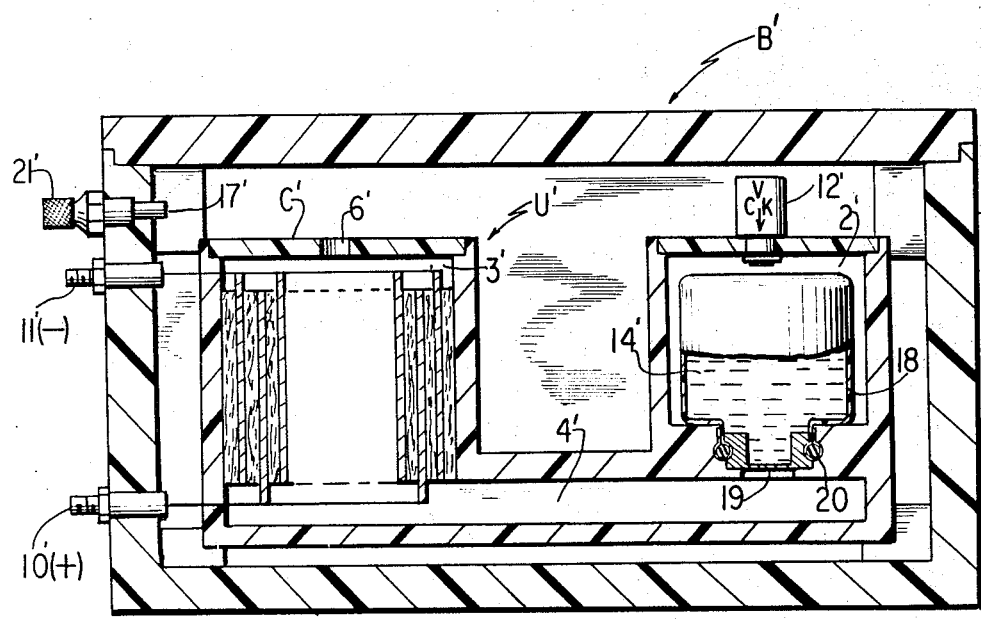
FIG. 2 is a similar diagrammatic showing of another embodiment of such a device.

FIGURE 2 shows another embodiment of the invention.

In this latter embodiment, one or more units U' replace unit U of FIG. 1. Each collapsible container 13 of unit U and its frangible wall 5 as depicted in FIGURE 1 are replaced by a collapsible container 18 of the bottle type which after being filled with electrolyte 14' is sealed by a frangible membrane or wall 19. A sealing gasket 20 mounted about the neck of container 18 serves to seal compartment 2' from the compartment 3'. The unit U' or a plurality of such units U' are positioned within a sealed container 1', similar to container 1 and gas under pressure may be introduced and evacuated via inlet 17'.

The activation of the cells C' in each unit U' is made in the same way as in the case of unit U of FIG. 1 and the decrease of pressure resulting from evacuating container 1' causes the rupture of membrane 19 which seals electrolyte container 18. As a result, residual pressure in compartment 2' causes collapse of container 18 and forces the electrolyte 14' to flow into compartment 3' and activate the cell components therein.

When several units U or U' are located in container 1 or 1', the cells thereof are electrically interconnected in conventional ways and their end terminals led to the outside terminals 10, 11 or 10', 11' as the case may be.

On some occasions, it may be difficult to locate a source of gas under pressure for delivery into containers 1 or 1'. To provide for such a contingency, it is possible, if desired, in the preparation of the battery B of FIG. 1 or B' of FIG. 2, to include in the gas inlets 17 or 17' conventional valves similar to those on tires so that gas under pressure may be introduced into containers 1 or 1' at the time of manufacture and retained therein until cell or battery activation is desired. At such time, then, it is merely necessary to open the valves in said inlets 17 or 17' to allow quick escape of gas under pressure from the respective containers 1 or 1' and compartments 3 or 3' thereof and then create pressure differentials between compartments 2 and 3 or 2' and 3' which will be sufficient to rupture the respective frangible walls or seals 5 or 19 and then permit flow of electrolyte 14 or 14' from respective containers 13 or 18 into electrode-containing compartments 3 or 3' thus activating the cells. Protective covers or screw caps 21 or 21' for inlets 17 or 17' may be provided to prevent accidental opening of the valves therein and premature activation of the cells in compartments 3 or 3'.

It is not necessary, of course, to include valves in the inlets 17 or 17' if a pressure air hose is available at the place of use. In such event, such hose is connected to these inlets for a sufficient length of time to insure high pressure in compartments 2 and 3, and on its removal, evacuation of gas under pressure from the containers 1 or 1' effected in any desired way.

While specific embodiments of the invention have been described, variations within the scope of the appended claims are possible and are contemplated. There is no intention, therefore, of limitation to the exact disclosure herein presented.

What is claimed is:

1. A deferred action electric device comprising a casing, a cell unit therein including a pair of intercommunicating compartments, activatable electric cell components in a first compartment, said first compartment being in free communication with the interior of said casing, electrolyte in the second compartment, frangible seal means normally preventing flow of said electrolyte from said second compartment into the first compartment and one-way check valve means opening into said second compartment from the interior of said casing, said casing being adapted to have gas under pressure introduced therein which introduces similar pressure into both compartments and which may subsequently be eliminated from the interior of the casing and from said first compartment while being retained in said second compartment by said one-way check valve means thereby providing a residual overpressure in said second compartment that ruptures said frangible seal means and effects flow of said electrolyte from said second compartment into said first compartment to activate the cell components therein.

2. A deferred action electric device as per claim 1 including a collapsible container for the electrolyte within the said compartment, and means for maintaining a seal between said container and said second compartment.

3. A deferred action electric device as per claim 1 including conduit means between said two compartments, said frangible seal means being located in said conduit means.

4. A deferred action electric device as per claim 1 including an open-mouthed collapsible container for the electrolyte within said second compartments and means for maintaining a seal between said container and said second compartmet, said frangible seal means being located in the mouth of said container.

5. A deferred action electric device as per claim 1, wherein free communication between the first compartment and the interior of said casing is provided by an unobstructed opening therebetween.

6. A deferred action electric device as per claim 1 including a valve-controlled opening in said casing for introducing gas under pressure into the interior of the latter and for evacuating the said gas.

7. A deferred action battery comprising a casing, a plurality of cell units therein, each unit including a pair of intercommunicating compartments, activatable electric cell components in a first compartment of each unit, said first compartment of each unit being in free communication with the interior of said casing, electrolyte in the second compartment of each unit, frangible seal means normally preventing flow of electrolyte from the second compartment of each unit into the first compartment thereof, one-way check valve means opening from the interior of said casing into the second compartment of each unit, said casing being adapted to have gas under pressure introduced into its interior and uniformly distributed to all the compartments of all the units therein and which may subsequently be withdrawn from the casing and the said first compartment of each unit while being retained in the said second compartment of each unit by said one-way check valve means thereby providing a residual overpressure in the second compartment of each unit that ruptures said frangible seal means between the respective first and second compartments of each unit and effects flow of electrolyte from the second into the first compartment of each unit to activate the cell components therein.

8. A deferred action battery as per claim 7 including a collapsible container for the electrolyte within the second compartment of each cell unit and means for maintaining a seal betwen each such container and the second compartment in which it is located.

9. A deferred action battery as per claim 7 including conduit means between the respective first and second compartments of each unit, said frangible seal means being located in the respective conduit means.

10. A deferred action battery as per claim 7 including an open-mouthed container for electrolyte within the second compartment of each unit, and means for maintaining a seal between the respective containers and the respective of said second compartments.

11. A deferred action battery as per claim 1, wherein free communication between the first compartment of each unit and the interior of said casing is provided by an unobstructed opening.

12. A deferred action battery as per claim 1 including a valve-controlled opening in said casing for introducing gas under pressure into and evacuating said gas from the container.

13. A deferred action electric cell comprising a casing, a cell unit therein comprising a pair of compartments, a first one containing activatable cell components and the second one containing electrolyte, conduit means between the compartments and frangible seal means normally preventing flow of electrolyte from the second compartment into the first compartment, means for introducing gas under pressure into the interior of the casing and into both compartments thereof and for eliminating said gas from the casing and the first of said compartments while retaining gas under pressure in the second compartment to create a pressure differential between the compartments that will rupture the frangible seal and permit flow of electrolyte into said first compartment.

14. A method of activating a deferred action electric device within a casing wherein activatable cell components and electrolyte are maintained apart in separate compartments by a frangible seal comprising the steps of introducing gas under pressure into the casing and all compartments and thereafter eliminating the gas under pressure from the casing and the cell-element-containing compartment only while maintaining the gas under pressure within the electrolyte-containing compartment thereby establishing a pressure differential between the compartments to rupture the seal and effect flow of electrolyte into the cell-element-containing compartment to activate the cell components therein.

15. A method of activating a deferred action battery within a casing containing a plurality of cell units each including activatable cell components and electrolyte maintained apart in separate compartments by a frangible seal, comprising the steps of introducing gas under pressure into the casing and all compartments therein and thereafter eliminating the gas under pressure from the casing and each cell-component-containing compartment only while maintaining the gas under pressure in each electrolyte-containing compartment thereby establishing pressure differentials between the respective cell-component-containing compartments and corresponding-electrolyte-containing compartments to rupture the frangible seals and effect flow of electrolyte into the respective cell-component-containing compartments to activate the cell components therein.

16. A method of activating a deferred action electric device within a casing including a compartment in free communication with the interior of the casing and containing activatable cell components, and a second compartment in one way communication into it only with the interior of the casing and containing electrolyte, and a frangible seal blocking communication between the two compartments, comprising the steps of providing equal gas pressures within the casing and both compartments and thereafter eliminating said gas pressure both from the interior of the casing and the first compartment while retaining the introduced gas pressure in the second compartment to provide a resulting differential of pressures on said frangible seal that ruptures the latter, thus unblocking communication between the two compartments and effecting flow of electrolyte from the second compartment into the first compartment to activate the cell components therein.

17. A method of activating a deferred action electric device which latter includes a casing, a compartment therein containing activatable cell components and a second compartment therein containing electrolyte and which compartments are maintained in blocked communication by a frangible seal, comprising the steps of introducing gas under pressure into the casing and like gas pressures as a result into each compartment thereof, and thereafter eliminating said gas under pressure from the casing and said first compartment only while retaining the introduced gas under pressure within the second compartment, the resulting pressure differential then created between the two compartments effecting the rupture of the frangible seal and unblocking communication between the compartments and the introduction of the electrolyte from the second compartment into the first compartment to activate the cell components in the latter.

No references cited.

WINSTON A. DOUGLAS, *Primary Examiner.*

C. F. LE FEVOUR, *Assistant Examiner.*